(12) United States Patent
Luo et al.

(10) Patent No.: US 8,615,760 B2
(45) Date of Patent: Dec. 24, 2013

(54) FACILITATING MEMORY ANALYSIS

(75) Inventors: Zhi Da Luo, Beijing (CN); Yao Qi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/886,741

(22) Filed: Sep. 21, 2010

(65) Prior Publication Data

US 2011/0078684 A1    Mar. 31, 2011

(30) Foreign Application Priority Data

Sep. 29, 2009    (CN) .......................... 2009 1 0175692

(51) Int. Cl.
*G06F 9/46*    (2006.01)
(52) U.S. Cl.
USPC ........................................................ 718/100
(58) Field of Classification Search
USPC ........................................................ 718/100
See application file for complete search history.

(56) References Cited

U.S. PATENT DOCUMENTS

| | | |
|---|---|---|
| 5,935,258 A | 8/1999 | Klein |
| 6,055,612 A | 4/2000 | Spertus et al. |
| 6,298,422 B1 | 10/2001 | Spilo et al. |
| 6,360,233 B1 | 3/2002 | Houldsworth |
| 6,401,181 B1 | 6/2002 | Franaszek et al. |
| 6,842,901 B1 | 1/2005 | Miller |
| 7,076,511 B1 | 7/2006 | Lari et al. |
| 7,310,655 B2 | 12/2007 | Dussud |
| 2002/0049719 A1* | 4/2002 | Shiomi et al. ..................... 707/1 |
| 2007/0256081 A1* | 11/2007 | Comer ......................... 719/316 |
| 2009/0125465 A1* | 5/2009 | Berg et al. ..................... 706/17 |

FOREIGN PATENT DOCUMENTS

| | | |
|---|---|---|
| CN | 1325069 A | 12/2001 |
| CN | 1427342 A | 7/2003 |
| EP | 0248557 A2 | 12/1987 |

\* cited by examiner

*Primary Examiner* — Mengyao Zhe
(74) *Attorney, Agent, or Firm* — Yee & Associates, P.C.; David A. Mims, Jr.

(57) ABSTRACT

A method and system for facilitating runtime memory analysis. The method includes: assigning a unique ID for each task in a running program; recording memory access events occurring during the running program, including the IDs of the task performing the memory accesses; issuing a task termination notification in response to a task terminating, the task termination notification including the ID of the terminating task; and releasing all the memory access events having the ID of the terminating task in the memory, in response to the task termination notification. This method and system can ensure that the memory access events stored in the memory will not increase unlimitedly, so that the memory overhead is reduced remarkably and dynamic memory analysis can be faster and more efficient.

12 Claims, 4 Drawing Sheets

FACILITATING MEMORY ANALYSIS

BACKGROUND

1. Field

The present invention relates to the computer field, particularly to runtime memory analysis, and more particularly, to a method and system for facilitating runtime memory analysis.

2. Description of the Related Art

To check potential runtime memory problems in a program, the program will usually be instrumented to track memory access events when the program runs. That is to say, some extra statements or instructions are inserted into the program, such that when the program is running, these extra statements or instructions are executed along with the original program instructions. The inserted statements or instructions will invoke a routine in a "memory access tracking" module, and the routine in the "memory access tracking" module will record memory access events in storage (e.g., a list and database in a memory).

Program instrumentation has been widely used in analysis tools (e.g., dynamic memory analysis tools), optimization tools and testing tools. These tools use program instrumentation to modify binary code or byte code, to achieve such goals as performance analysis, code optimization and coverage testing analysis.

FIG. 1 depicts a schematic diagram of program instrumentation for memory access tracking. As shown, the program runs in a runtime environment after being instrumented, and invokes a memory access tracking module via the inserted extra code during the running. The memory access tracking module stores memory access events into a storage, and loads the stored memory access events from the storage to perform relevant analysis.

For example, as to the following simple Java program:

```
class Simple
{
    int i;
        public void set (int i)
        {
            this.i = i
        }
},
``` some of the statements therein are instrumented so as to record memory access operations. The instrumented program is shown as follows (actually, all instrumentations are performed on binary code or byte code, instead of source code, and the program is shown only to illustrate how code is modified in instrumentation):

```
class Simple
{
    int i;
    public void set (int i)
    {
        this.i = i;
        runtimeRecorder.addMemAccess(this, "i", Constants.WRITE,
Thread.getId( ));
    }
}
```

Thus during the running of the program, when the program writes a new value to field i of class Simple, the method addMemAccess will be invoked. The method addMemAccess has 4 parameters, including the memory access object reference, field name, access type and current thread ID. In this way, the method will record a memory access event including the above information in the memory, and can perform dynamic memory analysis on the memory access events that have been recorded.

A thread is a kind of independent, schedulable flow of instructions, and is a logical flow that runs in the context of a process. Threads are an increasingly important programming model because of the requirement for concurrent software by multi-core processors today. Although a thread is a much more lightweight execution unit than a process, frequent creation and termination of threads is still expensive. To reduce thread creations and terminations, modern system allows a thread to fetch and execute tasks continuously in its lifetime.

A task is a stand-alone job that represents an instruction sequence and is completely independent of other jobs. A thread can actually contain multiple tasks, each running in the context of the thread. After one task finishes its execution in the thread, the thread fetches another task ready to be executed. Tasks are usually executed sequentially in a thread without interleaving. A typical model of thread/task is a thread pool and working queue, which are widely used in industrial software to improve system throughput and performance.

Since dynamic memory analysis tools should record every memory access event, and as program runs, more and more memory access events are recorded in storage (e.g., memory), the memory overhead will become larger and larger, and in the meantime, dynamic memory analysis will become slower and slower.

FIG. 2 shows a comparison of memory usages of two exemplary applications before and after using program instrumentation to perform dynamic memory analysis. As shown, for the WAS Trade application, the memory overhead of dynamic memory analysis is 3.3×; while for the Tomcat application, the memory overhead of dynamic memory analysis varies from 3× to 5×. It can be seen that tracking memory access in dynamic memory analysis will bring about huge/tremendous extra memory consumption.

Therefore, a method for reducing memory overhead in runtime memory analysis so as to make the runtime memory analysis more efficient is needed in the art.

SUMMARY

In one aspect of the present invention, there is provided a method for facilitating memory analysis, comprising: assigning a unique ID (identifier) for each task in a running program; recording memory access events occurring during the running program, including the IDs of the tasks performing the memory accesses; issuing a task termination notification in response to a task terminating, the task termination notification including the ID of the terminating task; and releasing all the memory access events having the ID of the terminating task in the memory, in response to the task termination notification.

In another aspect of the present invention, there is provided a system for facilitating memory analysis, comprising: a task ID assigning module for assigning a unique ID for each task in a running program; a memory access tracking module for recording memory access events occurring during the running program, including the IDs of the tasks performing the memory accesses; a task termination notification module for issuing a task termination notification in response to a task terminating, the task termination notification including the ID of the terminating task; and a task tracking process module for releasing all the memory access events having the ID of the terminating task in the memory, in response to the task termination notification.

BRIEF DESCRIPTION OF THE SEVERAL VIEWS OF THE DRAWINGS

The appended claims set forth the inventive features considered as characteristic of the present invention. However, the invention itself and its preferred modes, objects, features and advantages will be better understood by referring to the following detailed description of exemplary embodiments when read in conjunction with the accompanying drawings, in which:

DETAILED DESCRIPTION

The embodiments of the present invention will now be described with reference to the accompanying drawings. In the following description, numerous details are described to make the present invention to be fully understood. However, it is apparent to those skilled in the art that the implementation of the present invention can be made without some of these details. Moreover, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

The basic idea of the present inventions is to release the memory access events of a thread in the memory, or dump them into other media, when a task executed by a thread is changed. As a thread finishes its execution of an old task and turns to execute a new task during its running, the tasks are essentially independent of each other, and have no correlation. That is to say, the memory accesses occurred when the thread executes task R1 does not affect subsequent analysis by tools of memory access occurring when the thread executes task R2. Therefore, the information could be removed or dumped safely to reduce memory overhead without affecting the accuracy of dynamic memory analysis.

Figure 1:
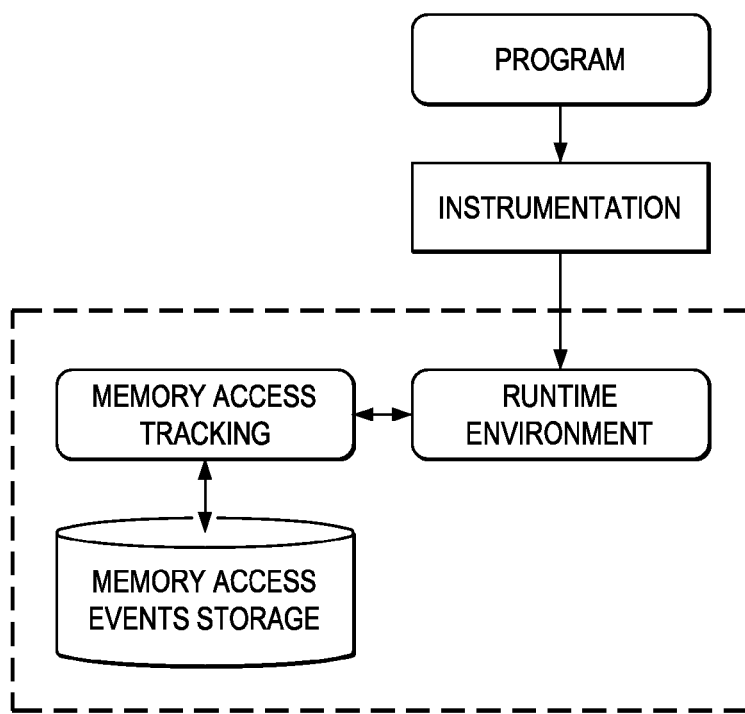
FIG. 1 is a schematic diagram of program instrumentation for memory access tracking.
Figure 3:
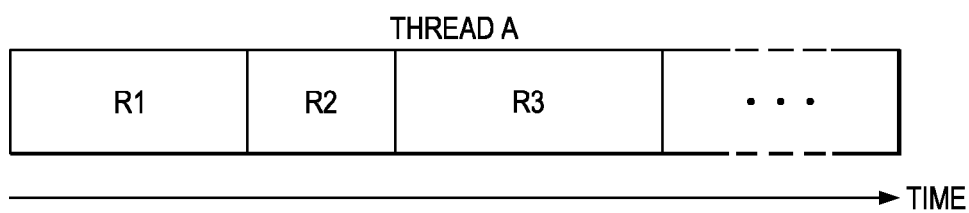
FIG. 3 shows the relationship between a Thread object A and Runnable objects R1, R2 and R3.
Figure 2:
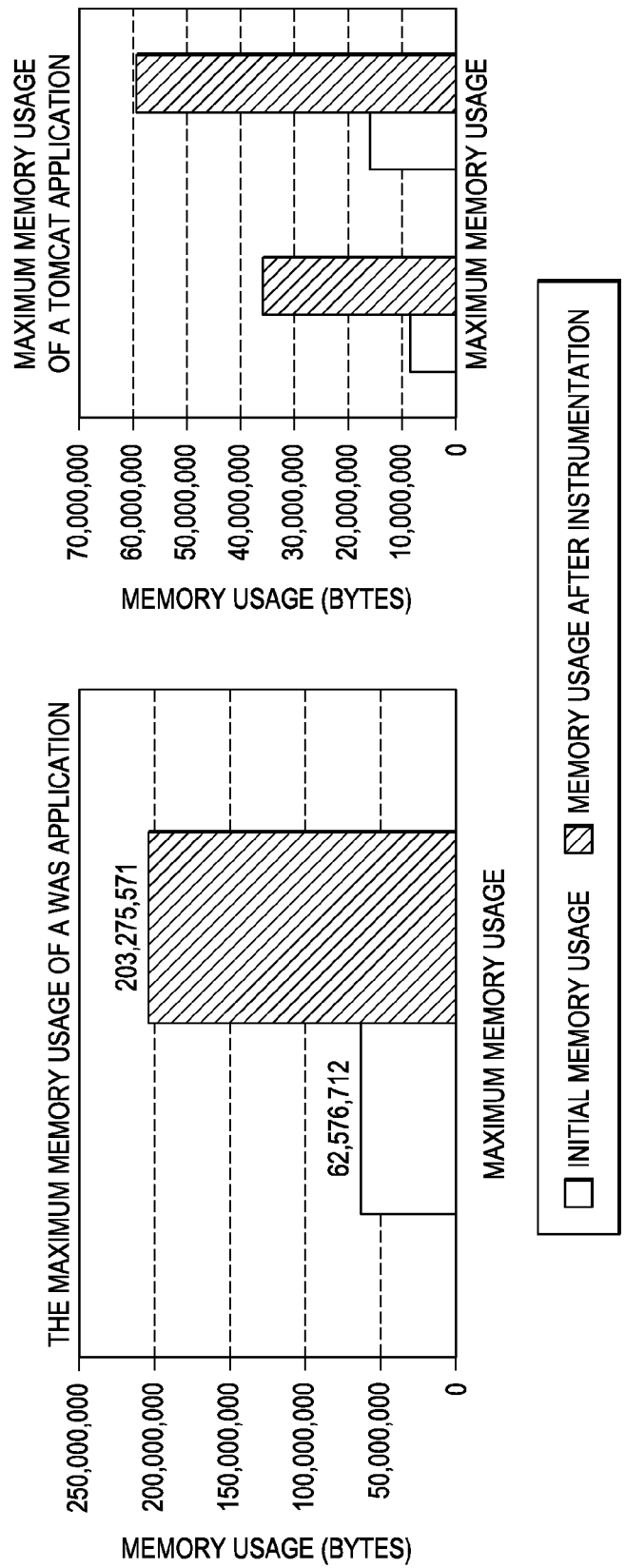
FIG. 2 shows a comparison of memory usages of two exemplary applications before and after using program instrumentation to perform dynamic memory analysis.

A Java™ system (Java is a trademark of Sun Microsystems, Inc.) is presented as an example to describe embodiments of the present invention. Of course, the present invention is not limited to a Java environment, and is suitable for other object-oriented language environment or other programming language environment. FIG. 3 shows the relationships between a Thread object A and Runnable objects R1, R2 and R3, wherein the Thread object A corresponds to a physical thread, and the Runnable objects R1, R2 and R3 etc. correspond to logical tasks. When a thread is running, a sequence of tasks is executed by the thread one by one. After Thread A finishes running Runnable R1, it will fetch Runnable R2 to execute. At this point of time, R2 occupies Thread A and the memory accesses happening in executing R1 can be removed, because memory accesses that contribute to dynamic memory analysis are from R2 now and those from R1 are past and thus are redundant for dynamic memory analysis.

Figure 4:
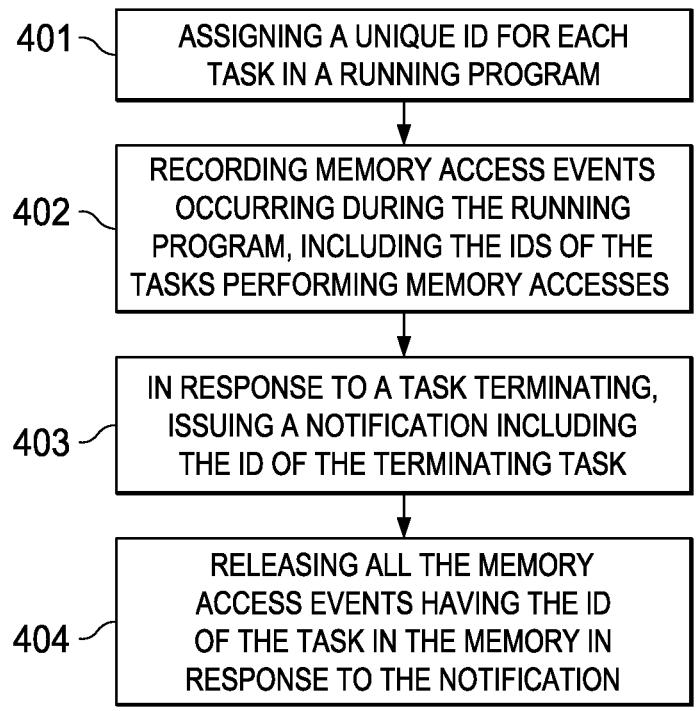
FIG. 4 shows a method for facilitating runtime memory analysis according to an embodiment of the present invention.

Now referring to FIG. 4, it shows a method for facilitating runtime analysis according to an embodiment of the present invention. As shown, the method comprises the following steps:

In step 401, each task during the program running is assigned a unique ID. According to an embodiment of the present invention, tasks are obtained by the thread from a working queue. In the Java environment, a specific task can be executed by implementing the Runnable interface, and an object of a class implementing the Runnable interface is called a Runnable object, and thus each Runnable object can represent a task. Program instrumentation (e.g., byte code instrumentation) can be used to add an integer field (called ObjectID) to each class implementing the Runnable interface, and at the same time to modify the constructor of the class, so that a unique integer value can be assigned to the integer field when a Runnable object is constructed, as the unique ID of the Runnable object. Any method known in the art can be used to assign a unique value to the integer field. For example, a counter can be set, and a Runnable object can get a counting value from the counter as a unique value to be assigned, and each time a Runnable object gets a counting value, the counter increments by 1 automatically.

Figure 5:
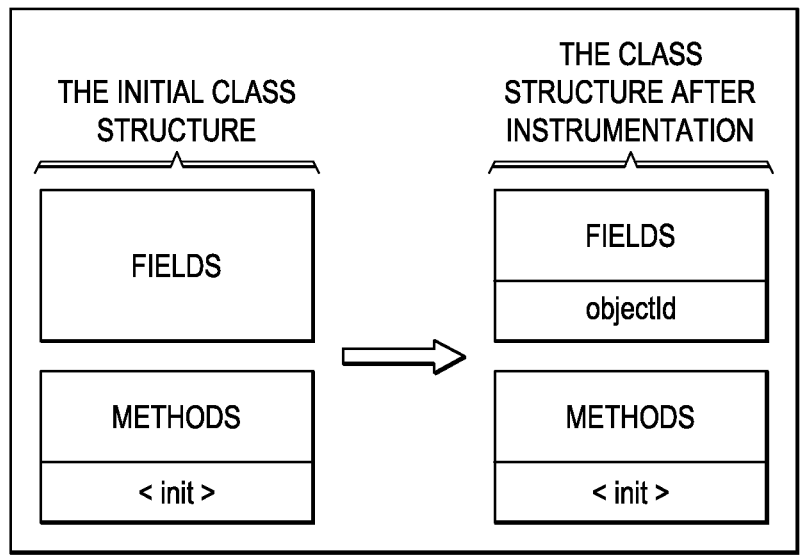
FIG. 5 shows the structures of a class implementing the Runnable interface before and after the instrumentation of adding an integer field and modifying a constructor.

FIG. 5 shows the structures of a class implement of the Runnable interface before and after the instrumentation of adding an integer field and modifying the constructor. As shown, compared with before the instrumentation, the class has an ObjectId field added and the constructor <init> modified.

In step 402, memory access events occurring during the program running are recorded, including the IDs of the tasks performing the memory accesses. This can be achieved by modifying an existing memory access tracking module invoked by the instrumentation code as described above, or by creating a new memory access tracking module, to make it record the ID of the current Runnable object as well, besides recording information like the memory access object reference, field name, access type and current thread ID, etc.

In step 403, in response to the termination of a task (e.g., a task executed by a thread), a notification including the ID of the terminated task is issued, e.g., to a task tracking processing module. In the Java environment, the byte code instrumentation technology could be used to add an afterRun( )method at the end of the method run( ) of a class implementing the Runnable interface, and the method is in charge of sending the ID of the current Runnable object to the task tracking processing module. The afterRun( ) method can obtain the ID from the ObjectID field of the current Runnable object and send it to the task tracking processing module.

Alternatively, byte code instrumentation technology could also be used to add a beforeRun( )method at the beginning of the method run( ) of a class implementing the Runnable interface, and the method is in charge of fetching the ID from ObjectID field of the current Runnable object and storing it in a data structure dedicated to store the IDs of the Runnable objects of the thread. For example, the data structure is a stack maintained for each thread. Thus, the afterRun( )method can fetch the ID of the Runnable object that is terminating from the top of the stack and send it to the task tracking processing module.

Figure 6:
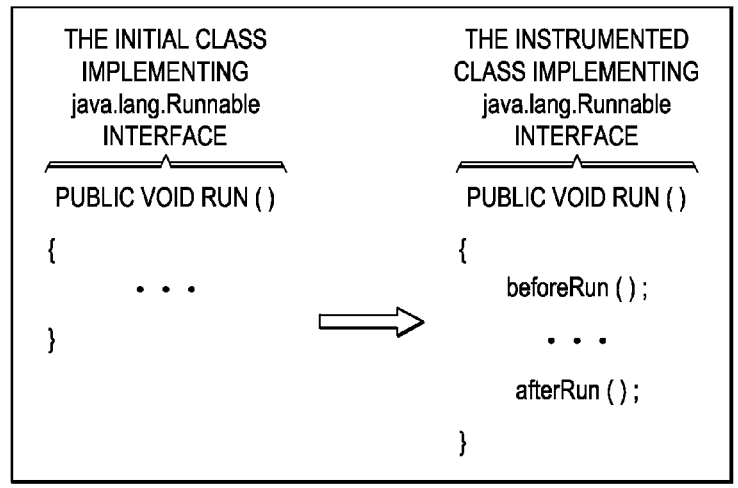
FIG. 6 shows the structures of the run method of the class implementing the Runnable interface before and after the instrumentation of adding beforeRun( ) and afterRun( )

FIG. 6 shows the structures of the run method of a class implementing the Runnable interface before and after the instrumentation of adding beforeRun( ) and afterRun( ). As shown, compared with before the instrumentation, a beforeRun( )method is added at the beginning, and an afterRun( )method is added at the end of the run method of the class.

In step 404, the memory access events having the task ID in the memory are released, e.g., by the task tracking processing module, after receiving the notification. When the task tracking processing module receives the notification (including the ID of the terminated the Runnable object), it can look up all the memory access event records with the ID in the memory access event records in the memory, and delete or dump to other storage all or part of them. Thus, the efficiency of dynamic memory analysis is increased and memory overhead is reduced.

Above is described a method for facilitating runtime memory analysis according to an embodiment of the present invention with reference to the accompanying drawings. It should be pointed out that the above description is only exemplary, and not a limitation to the present invention. In other embodiments of the present invention, the method can have more, less or different steps, and the relationships and the order of the steps may be different from that as described. For example, although in the above description, the method of the present invention is applied to tasks executed sequentially in a thread, it is apparent that the method of the present invention is also applicable to tasks executed in parallel, nestedly or interleavingly in a thread, as well as tasks executed outside threads. For example, although the above description uses Runnable objects in the Java environment to represent tasks as an example to describe the method of the present invention, this is only exemplary rather than limitation to the present invention. In other embodiments of the present invention, the method is also suitable for representing tasks with other objects or other programming unit (e.g., objects of classes implementing other task execution interfaces) in Java or other programming environments.

In the following, there is further described exemplarily a method for facilitating runtime memory analysis of the present invention by taking the C# langue as an example. As an important component of the .Net framework, the C# language is widely used in various native and network applications. The ThreadPool class in the .Net framework provides a thread pool for programmers, and task requests can be sent to the thread pool, and the task requests will be inserted into a task queue. A plurality of threads managed by the ThreadPool class obtain tasks concurrently from the task queue to execute, until the task queue is empty. The advantage of the thread pool lies in that there is no need to frequently create and destroy separate threads for each task, thereby reducing the overhead, and thus it is widely applied in multi-thread programming environments.

The following shows an example for analyzing a C# language program using the ThreadPool class:

```
example1.cs :
using System;
using System.Threading;
public class ThreadBase
{
        private int i;
    public static void Main ( )
    {
            System.Threading.WaitCallback waitCallback = new WaitCallback ( MyThreadWork );
            ThreadPool.QueueUserWorkItem ( waitCallback, "Task 1" );
            ThreadPool.QueueUserWorkItem ( waitCallback, "Task 2" );
            ThreadPool.QueueUserWorkItem ( waitCallback, "Task 3" );
            ThreadPool.QueueUserWorkItem ( waitCallback, "Task 4" );
            Console.ReadLine ( );
    }
    public static void MyThreadWork ( object state )
    {
            Console.WriteLine ( "Task {0} execution starts ......",
            (string)state );
            i++;
            Console.WriteLine ( "Task {0} execution terminates ......",
(string) state );
    }
}
```

The code above first instantiates a System.Threading.WaitCallback object, waitCallback. WaitCallback is a delegate (equivalent to an interface in a Java environment), and represents the call back method to be executed by a thread in the thread pool. Its prototype is as follows:

[ComVisibleAttribute(true)]

public delegate void WaitCallback (Object state)

The parameter of the WaitCallback is "Object state", which comprises the object of the information to be used by the call back method. According to the prototype of the WaitCallback delegate, a function with the same signature is declared as follows:

public static void MyThreadWork (object state)

This function is a task to be executed by the thread. A programmer submits a task request to the thread pool by the ThreadPool.QueueUserWorkItem method.

As shown in the C# program above, an instance of class WaitCallback, waitCallback, represents a task to be performed by a thread in the thread pool, the voidMyThreadWork (object state) method defines the work to be executed by the task, and the thread in the thread pool finishes the waitCallback task by executing the method.

The embodiment of the present invention first uses the existing code instrumentation technology to add an integer field (which can be called as ObjectID) in the class System.Thrading.WaitingCallback, and to modify the construction function of the class in the mean time, so that when a System.Threading.WaitCallback object is constructed, a unique integer value is assigned to the integer field as the unique ID of the System. Threading.WaitCallback object.

When the thread executes the task waitCallback, i.e., during the running of the method MyThreadWork, memory access events will be generated, e.g., i++. After the i++ operation, the memory access events, including the IDs of the tasks performing the memory accesses, occurring during the running of the program are recorded by inserted code, as shown in the following code fragments:

```
public static void MyThreadWork ( object state )
{
    Console.WriteLine ( "Task {0} execution starts ......",
    (string)state );
    i++;
        runtimeRecorder.addMemAccess(this, "i", Constants.READ,
<thread id>, <waitCallback object id>);
        Console.WriteLine ( "Task {0} execution terminates ......",
(string) state );
}
```

During the running of the program, the inserted runtimeRecorder.addMemAccess method not only records information like the memory access object reference, field name, access type and current thread ID, etc., but also records the ID of the current waitCallback object, and the information is recorded in the memory as well.

When the running of the task waitCallback is finished, that is, the execution of the MyThreadWork method is completed, the embodiment of the present invention inserts a runtime.removeEvent method after the last instruction of the MyThreadWork method, as shown by the following code. The unique parameter passed to runtime.removeEvent is the ID of the terminated task waitCallback, and the method looks up the memory access events generated during the running of the task in the memory by the task ID, and removes theses events so as to reduce the memory consumption of the dynamic memory analysis tool.

```
public static void MyThreadWork ( object state )
{
    Console.WriteLine ( "Task {0} execution starts ......",
    (string)state );
    i++;
    runtimeRecorder.addMemAccess(this, "i", Constants.READ,
<thread id>, <waitCallback object id>);
    Console.WriteLine ( "Task {0} execution terminates ......",
(string) state );
    runtime.removeEvent(<waitCallback object id>);
}
```

Figure 7:
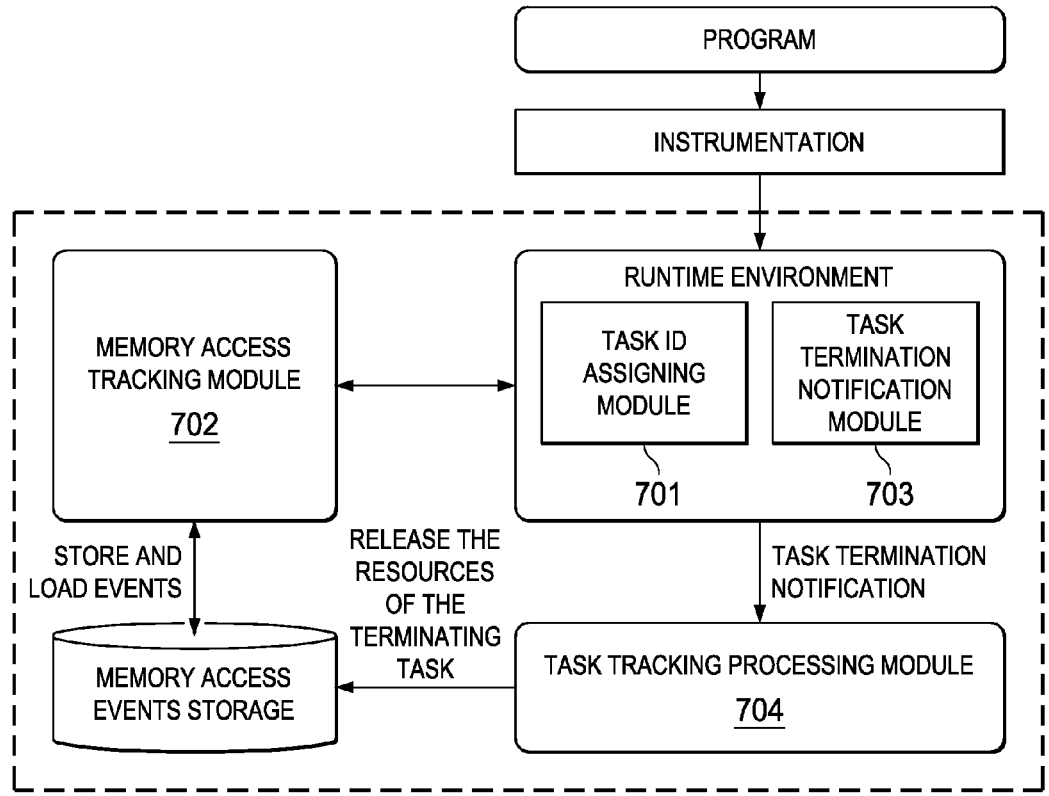
FIG. 7 shows a system for facilitating runtime memory analysis according to an embodiment of the present invention.

Now referring to FIG. 7, it shows a system for facilitating runtime memory analysis according to an embodiment of the present invention. As shown, the system includes a task ID assigning module 701, a memory access tracking module 702, a task termination notification module 703 and a task tracking processing module 704.

The task ID assigning module 701 is for assigning a unique task ID to each task running in the program. According to an embodiment of the present invention, in the Java environment, the task ID assigning module 701 can be implemented in the following manner: adding an integer field which can be called ObjectID in each class implementing the Runnable interface by program instrumentation, and inserting code for assigning a unique integer value to the integer field in the constructor of the class, the integer value to be used as the unique ID of the Runnable object of the class.

The memory access tracking module 702 is for recording memory access events, and the recorded memory access event includes the ID of the task executing the memory access operation. According to an embodiment of the present invention, in the Java environment, the memory access tracking module 702 can be implemented in the following manner: modifying a existing memory access tracking module invoked by the instrumented code, or creating a new memory access tracking module, to make it record the ID of the current Runnable object besides recording information like the memory access object reference, field name, access type and current thread ID, etc. The task termination notification module 703 is for, when a task (e.g., a task executed by a thread) is finished, notifying the task tracking processing module 704 to process. According to an embodiment of the present invention, in the Java environment, the task termination notification module 703 could be implemented in the following manner: adding an afterRun( )method at the end of the method run( ) of a class implementing the Runnable interface by the program instrumentation (e.g., byte code instrumentation) technology, and the method is in charge of sending the ID of the current Runnable object to the task tracking processing module 704. The afterRun( )method can directly fetch its ID from the objectID field of the current Runnable object, and send it to the task tracking processing module. According to another embodiment of the present invention, the byte code instrumentation technology can also be used to add a beforeRun( )method at the beginning of the method run( ) of a class implementing Runnable interface, and the method is in charge of fetching its ID from the ObjectID field of the current Runnable object and storing it to a data structure such as a stack dedicated for storing the IDs of Runnable objects of the thread. In this way, after the run( )method is finished, the afterRun( )method can get the ID of the Runnable object that is finishing from the top of the stack and send it to the task tracking processing module 704.

The task tracking processing module 704 is for, after receiving the notification from the task termination notification module 703, looking up the memory access events including the ID of the finished task from all the memory access events stored in the memory, and removing or dumping to other storage all or part of the memory access events including the ID of the finished task, so as to improve the efficiency of dynamic memory analysis and reduce its memory overhead.

A system for runtime memory analysis is described above according to an embodiment of the present invention with reference to the accompanying drawings. It should be pointed out that the description above is only exemplary, not limited to the present invention. In other embodiments of the present invention, the system can have more, less or different modules, and the relationships between the modules can be different from that is described. For example, the system of the present invention can either be included in an existing runtime memory analysis tool, or exist as a standalone system.

The method and system for facilitating runtime memory analysis according to embodiments of the present invention can ensure that the memory access events stored in the memory will not increase unlimitedly, so that the memory overhead is reduced prominently and dynamic memory analysis is rendered faster and more effective.

The present invention can be implemented by hardware, software, or a combination thereof. The present invention can be implemented in a single computer system in a centralized manner, or in a distributed manner in which different components are distributed in several inter-connected computer systems. Any computer system or other devices suitable for executing the method described herein are suitable. A typical combination of hardware and software can be a general-purpose computer system with a computer program, which when being loaded and executed, controls the computer system to execute the method of the present invention and constitutes the apparatus of the present invention.

The present invention can also be embodied in a computer program product, which includes all the features that enable realizing the methods described herein, and when being loaded into a computer system, can execute the method.

Although the present invention has been illustrated and described with reference to the preferred embodiments, those skilled in the art should appreciate that various changes in form and detail can be made thereto without departing from the spirit and scope of the present invention.

What is claimed is:

1. A method operable by a computer system for facilitating memory analysis of a memory, comprising:
    assigning a unique ID for each task in a running program;
    recording memory access events occurring during running of the running program in a data storage device, including the IDs of the tasks performing the memory accesses;
    analyzing the memory using the memory access events;
    issuing a task termination notification in response to a task terminating, the task termination notification including the ID of the terminating task, wherein the issuing of the task termination notification in response to a task terminating is implemented by inserting a method that will be invoked, after the task running is finished, into a class of objects representing tasks, wherein the method is operable for issuing the task termination notification including the ID of the object; and
    in response to the task termination notification, releasing all the memory access events having the ID of the terminating task in the memory.

2. The method of claim 1, wherein the running program runs in an object-oriented language environment, and the assigning a unique ID for each task in the running program is implemented by:
    adding a field for storing the object ID in a class of objects representing tasks by program instrumentation; and
    modifying a constructor of the class to assign a unique value to the field as the unique ID of the object.

3. The method of claim 1, wherein the ID of the object included in the task termination notification is obtained by:
    inserting the method executed after the object starts to run into the class of objects representing tasks by program instrumentation, wherein the method is operable for storing the ID of the object into a stack; and
    fetching, by the method executed when the object running is finished, the ID of the object from top of the stack.

4. The method of claim 1, wherein the class of objects representing tasks is a class implementing a task execution interface.

5. The method of claim 1, wherein the running program is a thread, and wherein the task is obtained by the thread from a working queue.

6. A system comprising a processor and memory for facilitating memory analysis of a memory, comprising:
    a task ID assigning module for assigning a unique ID for each task in a running program;
    a memory access tracking module for recording memory access events occurring during running of the running program in a data storage device, including the IDs of the tasks performing the memory accesses, and analyzing the memory using the memory access events;
    a task termination notification module for issuing a task termination notification in response to a task terminating, the task termination notification including the ID of the terminating task, wherein the task termination notification module is implemented by inserting a method that will be invoked, when the task running is finished, into the class of objects representing tasks, wherein the method is operable for issuing the task termination notification including the ID of the object; and
    a task tracking processing module for releasing all the memory access events having the ID of the terminating task in the memory in response to the task termination notification.

7. The system of claim 6, wherein the running program runs in an object-oriented language environment, and the task ID assigning module is implemented by:
    adding a field for storing the object ID in a class of objects representing tasks by program instrumentation; and
    modifying a constructor of the class to assign a unique value to the field as the unique ID of the object.

8. The system of claim 6, wherein the ID of the object included in the task ending notification is obtained by:
    inserting a method executed when the object starts to run into the class of objects representing tasks by program instrumentation, wherein the method is operable for storing the ID of the object into a stack; and
    fetching, by the method executed when the object running is finished, the ID of the object from top of the stack.

9. The system of claim 6, wherein the class of objects representing tasks is a class implementing a task execution interface.

10. The system of claim 6, wherein the running program is a thread, and wherein the task is obtained by the thread from a working queue.

11. A computer program product comprising a tangible computer usable storage device having computer executable program code stored thereon, wherein the computer executable program code is operable for performing the steps of claim 1 when executed by a computer system.

12. The method of claim 1, wherein the method is operable to send the unique ID to a task tracking module.

* * * * *